US011002173B2

(12) United States Patent
Matsumoto et al.

(10) Patent No.: US 11,002,173 B2
(45) Date of Patent: May 11, 2021

(54) FREEZING DIAGNOSING DEVICE AND ENGINE CONTROL APPARATUS

(71) Applicant: SUBARU CORPORATION, Tokyo (JP)

(72) Inventors: Naoki Matsumoto, Tokyo (JP); Kosuke Furuta, Tokyo (JP); Daiki Kita, Tokyo (JP); Manabu Ishikawa, Tokyo (JP); Yoshimichi Sasaki, Tokyo (JP); Naoki Miura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/733,826

(22) Filed: Jan. 3, 2020

(65) Prior Publication Data

US 2020/0284181 A1 Sep. 10, 2020

(30) Foreign Application Priority Data

Mar. 5, 2019 (JP) .............................. JP2019-039405

(51) Int. Cl.
*F01N 11/00* (2006.01)
*F01N 3/021* (2006.01)

(52) U.S. Cl.
CPC ............ *F01N 11/002* (2013.01); *F01N 3/021* (2013.01); *F01N 2560/06* (2013.01);
(Continued)

(58) Field of Classification Search
CPC ........ F01N 3/021; F01N 3/023; F01N 11/002; F01N 2560/06; F01N 2560/07; F01N 2560/08; F01N 2900/0416; F01N 2900/0418; F01N 2900/0601; F01N 2900/10; F01N 2900/12; F01N 2900/1404; F01N 2900/1411; F01N 2900/1628; F01N 2900/1631; F02D 2200/021; F02D 2200/70
(Continued)

(56) References Cited

U.S. PATENT DOCUMENTS

2006/0288693 A1* 12/2006 Endo .................... F01N 3/0814
60/297

FOREIGN PATENT DOCUMENTS

EP   2 305 977 A1   4/2011
JP   2007-2694 A    1/2007
(Continued)

*Primary Examiner* — Jorge L Leon, Jr.
(74) *Attorney, Agent, or Firm* — Troutman Pepper Hamilton Sanders LLP

(57) ABSTRACT

A freezing diagnosing device to be installed in an engine includes an ambient temperature sensor, a liquid temperature sensor, and a freezing determination unit. The ambient temperature sensor detects an ambient temperature. The liquid temperature sensor detects the temperature of a liquid held in the engine. The freezing determination unit determines that a freezing state of a pipe coupled to a pressure sensor in the engine is established when one or both of a first condition and a second condition are satisfied. The first condition is that the ambient temperature detected by the ambient temperature sensor is equal to or less than a first threshold. The second condition is that the temperature of the liquid detected by the liquid temperature sensor is equal to or less than a second threshold.

9 Claims, 3 Drawing Sheets

(52) U.S. Cl.
CPC ...... *F01N 2560/07* (2013.01); *F01N 2560/08* (2013.01); *F01N 2900/0418* (2013.01); *F01N 2900/0601* (2013.01); *F01N 2900/10* (2013.01); *F01N 2900/12* (2013.01); *F01N 2900/1404* (2013.01); *F02D 2200/021* (2013.01); *F02D 2200/70* (2013.01)

(58) Field of Classification Search
USPC ......... 60/277, 285, 286, 295, 297, 303, 311, 60/320
See application file for complete search history.

(56) References Cited

FOREIGN PATENT DOCUMENTS

| JP | 2009-221862 A | 10/2009 |
| JP | 2011-69259 A | 4/2011 |
| JP | 2012-184756 A | 9/2012 |

* cited by examiner

FREEZING DIAGNOSING DEVICE AND ENGINE CONTROL APPARATUS

CROSS-REFERENCE TO RELATED APPLICATIONS

The present application claims priority from Japanese Patent Application No. 2019-039405 filed on Mar. 5, 2019, the entire contents of which are hereby incorporated by reference.

BACKGROUND

The disclosure relates to a freezing diagnosing device that determines a freezing state in an exhaust system of an engine and to an engine control apparatus that includes the freezing diagnosing device.

An exhaust passage of an engine mounted on a vehicle such as an automatic vehicle is provided with a post-processing device that purifies exhaust gas. One example of the post-processing device is a particulate matter filter, such as a gasoline particulate filter (GPF) or a diesel particulate filter (DPF). The particulate matter filter includes ceramics, for example, and filters the exhaust gas to collect particulate matter (PM) contained in the exhaust gas. As a technique to detect the state of the particulate matter deposited on the particulate matter filter, it is known to detect a pressure difference (differential pressure) between an upstream (inlet) side and a downstream (outlet) side of the particulate matter filter, for example. However, in a low-temperature environment, water vapor contained in the exhaust gas discharged from the engine can transform into condensed water in a pipe for introducing the exhaust gas to a differential pressure sensor that detects the differential pressure. The condensed water can be frozen in some cases. Such freezing of the pipe coupled to the differential pressure sensor can hinder an accurate detection of the differential pressure between before and behind the particulate matter filter, causing an error in estimating a soot accumulation amount on the basis of the detected differential pressure or an error in a self-diagnosis of the vehicle, such as a diagnosis of the particulate matter filter.

Techniques relevant to differential pressure detection for a particulate matter filter are disclosed in Japanese Unexamined Patent Application Publication (JP-A) Nos. 2009-221862, 2012-184756, 2007-002694, and 2011-069259, for example. JP-A No. 2009-221862 discloses that an estimation of the PM accumulation amount based on the differential pressure of the particulate matter filter is prohibited from being executed when the temperature of cooling water for the engine is low because the differential pressure of the particulate matter filter decreases after the start of cooling of the engine. JP-A No. 2012-184756 discloses to determine the likelihood of freezing of a differential pressure pipe of a differential pressure sensor disposed on the particulate matter filter on the basis of the ambient temperature. JP-A No. 2007-002694 discloses that the differential pressure sensor is determined as being in a non-freezing state when the atmospheric temperature has been higher than a predetermined temperature for a predetermined period of time or longer or when the temperature of exhaust gas has been higher than a predetermined temperature for another predetermined period of time or longer. JP-A No. 2011-069259 discloses to determine whether the differential pressure pipe is in a freezing state on the basis of detected differential pressure. When the differential pressure pipe is determined as being in the freezing state, the normal regeneration operation of the particulate matter filter is prohibited from being performed until the differential pressure pipe is determined as being in a non-freezing state.

SUMMARY

An aspect of the technology provides a freezing diagnosing device to be installed in an engine. The engine is provided with an exhaust passage, a particulate matter filter, a pipe, and a pressure sensor. The particulate matter filter is disposed in the exhaust passage. The pipe has a first end and a second end opposite to the first end. The first end is coupled to a region adjacent to the particulate matter filter in the exhaust passage. The pressure sensor is coupled to the second end of the pipe. The freezing diagnosing device includes an ambient temperature sensor, a liquid temperature sensor, and a freezing determination unit. The ambient temperature sensor is configured to detect an ambient temperature. The liquid temperature sensor is configured to detect a temperature of a liquid held in the engine. The freezing determination unit is configured to determine a freezing state of the pipe as being established when one or both of a first condition and a second condition are satisfied. The first condition is that the ambient temperature detected by the ambient temperature sensor is equal to or less than a first threshold. The second condition is that the temperature of the liquid detected by the liquid temperature sensor is equal to or less than a second threshold.

An aspect of the technology provides a freezing diagnosing device to be installed in an engine. The engine is provided with an exhaust passage, a particulate matter filter, a pipe, and a pressure sensor. The particulate matter filter is disposed in the exhaust passage. The pipe has a first end and a second end opposite to the first end. The first end is coupled to a region adjacent to the particulate matter filter in the exhaust passage. The pressure sensor is coupled to the second end of the pipe. The freezing diagnosing device includes a freezing determination unit including a transferred heat estimator configured to estimate an amount of heat transferred from the exhaust passage to the pipe, and a dissipated heat estimator configured to estimate an amount of heat dissipated from the pipe. The freezing determination unit is configured to determine whether a freezing state of the pipe is established, and to determine, after determining the freezing state as being established, a freezing release state of the pipe as being established when an integrated value of a difference is greater than an amount of heat required for melting ice having a quantity corresponding to an interior volume of the pipe. The difference is a resultant of a subtraction of the amount of dissipated heat from the amount of transferred heat.

An aspect of the technology provides an engine control apparatus that controls an engine and an auxiliary device of the engine. The engine control apparatus includes the freezing diagnosing device according to any aspect of the technology. The engine control apparatus is configured to prohibit execution of control based on an output from the pressure sensor when the freezing determination unit determines the freezing state as being established.

An aspect of the technology provides an engine control apparatus that controls an engine and an auxiliary device of the engine. The engine control apparatus includes the freezing diagnosing device according to any aspect of the technology. The engine control apparatus is configured to prohibit execution of control based on an output from the pressure sensor after the freezing determination unit determines the freezing state as being established and until the freezing determination unit determines the freezing release state as being established.

An aspect of the technology provides a freezing diagnosing device to be installed in an engine. The engine is provided with an exhaust passage, a particulate matter filter, a pipe, and a pressure sensor. The particulate matter filter is disposed in the exhaust passage. The pipe has a first end and a second end opposite to the first end. The first end is coupled to a region adjacent to the particulate matter filter in the exhaust passage. The pressure sensor is coupled to the second end of the pipe. The freezing diagnosing device includes an ambient temperature sensor configured to detect an ambient temperature; a liquid temperature sensor configured to detect a temperature of a liquid held in the engine; and circuitry configured to determine a freezing state of the pipe as being established when one or both of a first condition and a second condition are satisfied. The first condition is that the ambient temperature detected by the ambient temperature sensor is equal to or less than a first threshold. The second condition is that the temperature of the liquid detected by the liquid temperature sensor is equal to or less than a second threshold.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

Some embodiments of a freezing diagnosing device that diagnoses a freezing state of a pressure sensor pipe and an engine control apparatus according to an embodiment of the technology will now be described. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

According to an embodiment of the technology, the freezing diagnosing device and the engine control apparatus may be disposed in, for example, a flat-four gasoline direct-injection engine that serves as a traveling power source in a vehicle such as a car.

According to an embodiment of the technology, the freezing diagnosing device and the engine control apparatus each include a freezing determination unit 102 described below, for example. The freezing diagnosing device and the engine control apparatus may further include an ambient temperature sensor 120 and a water temperature sensor 21 that are described below, for example.

Figure 1:
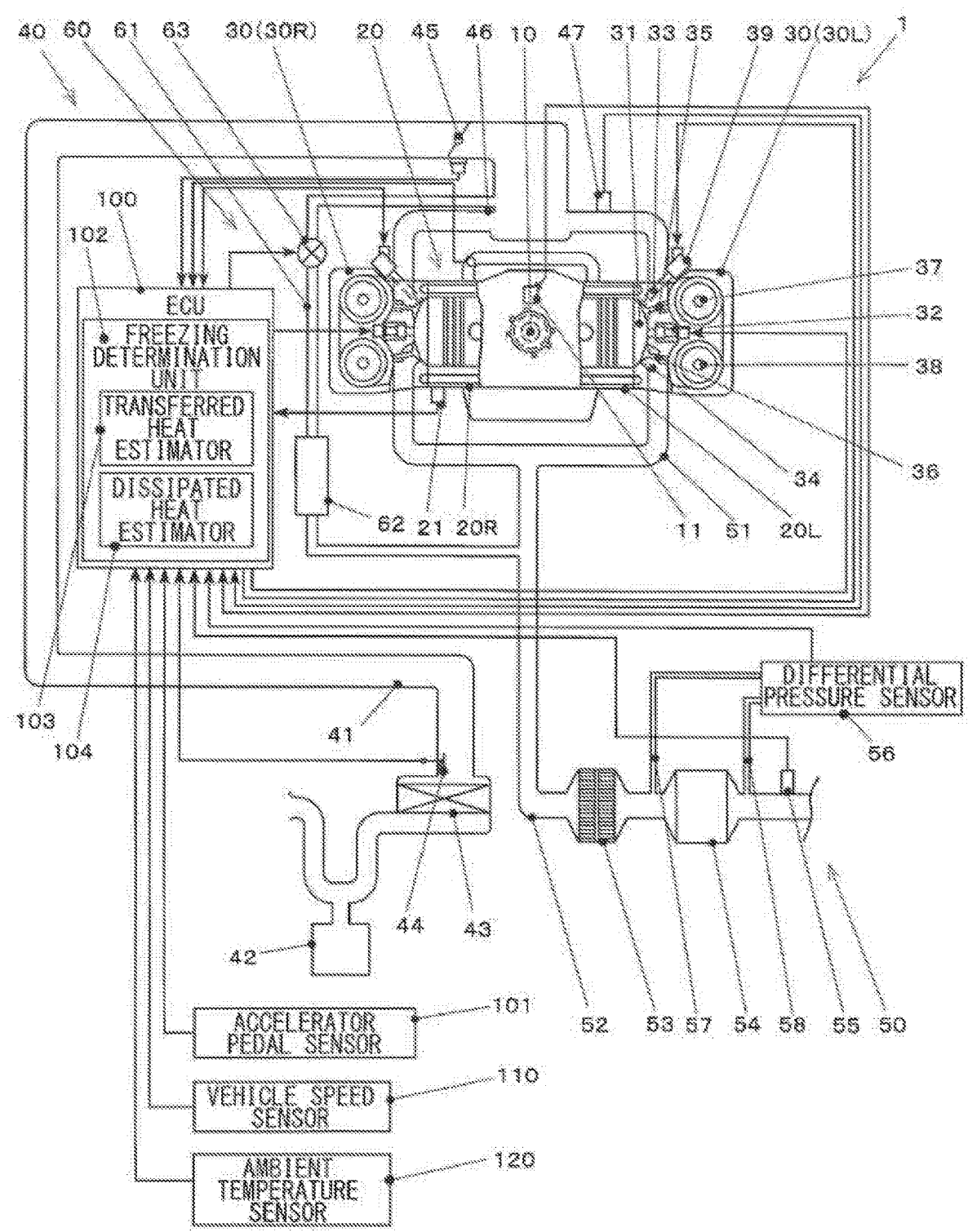
FIG. 1 is a schematic diagram illustrating an example configuration of an engine that includes a freezing diagnosing device that determines whether a freezing state of a pressure sensor pipe is established, and an engine control apparatus according to one embodiment of the technology.

FIG. 1 is a schematic diagram illustrating an example configuration of an engine 1 that includes the freezing diagnosing device and the engine control apparatus according to the embodiment of the technology. The engine 1 may include a crank shaft 10, a cylinder block 20 that includes a right cylinder block portion 20R and a left cylinder block portion 20L, a cylinder head 30 that includes a right cylinder head portion 30R and a left cylinder head portion 30L, an intake system 40, an exhaust system 50, an exhaust gas recirculation (EGR) device 60, and an engine control unit (ECU) 100, for example. In one embodiment, the ECU 100 may serve as an "engine control apparatus".

The crank shaft 10 may be a rotary shaft serving as an output shaft of the engine 1. The crank shaft 10 may be coupled to a non-illustrated power transmission mechanism, such as a transmission, at one end. The crank shaft 10 may be provided with a crank pin eccentrically to the rotary shaft. The crank pin may be coupled to a non-illustrated piston via a non-illustrated connecting rod. A crank angle sensor 11 may be disposed on an end of the crank shaft 10. The crank angle sensor 11 may detect an angle of the crank shaft 10. An output from the crank angle sensor 11 may be transmitted to the ECU 100. On the basis of the output from the crank angle sensor 11, the ECU 100 may calculate the number of revolutions of the engine 1 (i.e., the revolution speed of the crank shaft 10).

The cylinder block 20 may include the right cylinder block portion 20R and the left cylinder block portion 20L. When longitudinally mounted relative to the vehicle body, the right cylinder block portion 20R and the left cylinder block portion 20L may be respectively disposed on the right and the left sides of the crank shaft 10 and hold the crank shaft 10 therebetween. A crankcase may be provided in a central portion of the cylinder block 20. The crankcase may define a space that accommodates the crank shaft 10. The crankcase may be provided with a main bearing that rotatably supports a journal of the crank shaft 10. In the embodiment where the engine has four cylinders, the right cylinder block portion 20R and the left cylinder block portion 20L that hold the crankcase therebetween may each include two cylinders. A non-illustrated piston may reciprocate in each of the cylinder.

A water temperature sensor 21 may be disposed on the cylinder block 20. The water temperature sensor 21 may detect the temperature of cooling water for the engine 1. An output from the water temperature sensor 21 may be transmitted to the ECU 100. In one embodiment, the water temperature sensor 21 may serve as a "liquid temperature sensor".

The right cylinder head portion 30R and the left cylinder head portion 30L of the cylinder head 30 may be respectively disposed on the right and left ends of the cylinder block 20 that are opposite to the crank shaft 10. The cylinder head 30 may include a combustion chamber 31, an ignition plug 32, an intake port 33, an exhaust port 34, an intake valve 35, an exhaust valve 36, an inlet cam shaft 37, an exhaust cam shaft 38, and an injector 39, for example. The combustion chamber 31 may have a portion dented in a pent-roof shape and facing the crown face of a piston of the cylinder head 30, for example. In response to an ignition signal from the ECU 100, the ignition plug 32 may generate a spark to ignite an air-fuel mixture. The ignition plug 32 may be disposed on a central portion of the combustion chamber 31 when seen along the axial direction of the cylinder.

The intake port 33 may be a flow path through which combustion air (new air) is introduced to the combustion chamber 31. The exhaust port 34 may be a flow path through which burned gas (exhaust gas) is discharged from the combustion chamber 31. The intake valve 35 and the exhaust valve 36 may respectively open and close the intake port 33 and the exhaust port 34 at a predetermined valve-timing. For example, each of the cylinders may include two intake valves 35 and two exhaust valves 36. The intake valve 35 and the exhaust valve 36 may be respectively opened and closed by the inlet cam shaft 37 and the exhaust cam shaft 38. The inlet cam shaft 37 and the exhaust cam shaft 38 may rotate in synchronization with half the number of revolutions of the crank shaft 10. The inlet cam shaft 37 and the exhaust cam shaft 38 may each have a cam sprocket provided with a non-illustrated valve-timing variable mechanism. The valve-timing variable mechanism may vary an opening timing and a closing timing of each of the valves by advancing or retarding the phase of each of the cam shafts. The injector 39 may generate an air-fuel mixture by injecting fuel into the combustion chamber 31 in response to a valve-opening signal from the ECU 100. The injector 39 may be disposed such that a nozzle through which fuel is injected extends from an interior region of the combustion chamber 31 adjacent to the intake port 33 to an interior of the cylinder.

The intake system 40 may take in and introduce air into the intake port 33. The intake system 40 may include an intake duct 41, a chamber 42, an air cleaner 43, an airflow meter 44, a throttle valve 45, an intake manifold 46, and an intake pressure sensor 47, for example.

The intake duct 41 may be a flow path into which the ambient air is taken and through which the ambient air is introduced to the intake port 33. The chamber 42 may be a space provided near an inlet of the intake duct 41 and communicated with the intake duct 41. The air cleaner 43 may filter the air to remove dust and other matter. The air cleaner 43 may be disposed downstream of the chamber 42 communicated with the intake duct 41. The airflow meter 44 may measure the airflow rate in the intake duct 41 or the intake air mass in the engine 1. The airflow meter 44 may be disposed near an outlet of the air cleaner 43. An output from the airflow meter 44 may be transmitted to the ECU 100.

The throttle valve 45 may be a butterfly valve that regulates the airflow rate to control an output of the engine 1. The throttle valve 45 may be disposed near a coupled portion between the intake duct 41 and the intake manifold 46. The throttle valve 45 may be opened and closed by a non-illustrated electrically-driven throttle actuator on the basis of a target throttle opening position. The target throttle opening position may be determined by the ECU 100 on the basis of a torque requested by a driver, for example. Additionally, the throttle valve 45 may be provided with a throttle sensor that detects a throttle opening position. An output from the throttle sensor may be transmitted to the ECU 100. The intake manifold 46 may be a branch pipe that distributes the air to the intake port 33 of each of the cylinders. The intake manifold 46 may be provided downstream of the throttle valve 45. The intake pressure sensor 47 may detect the air pressure or manifold pressure in the intake manifold 46. An output from the intake pressure sensor 47 may be transmitted to the ECU 100.

The exhaust system 50 may discharge exhaust gas through the exhaust port 34 to the outside. The exhaust system 50 may include an exhaust manifold 51, an exhaust pipe 52, a catalyst 53, a gasoline particulate filter (GPF) 54, an exhaust gas temperature sensor 55, a differential pressure sensor 56, an upstream pipe 57, and a downstream pipe 58, for example.

The exhaust manifold 51 may be a collecting pipe that collects the exhaust gas discharged through the exhaust port 34 of each of the cylinders. The exhaust pipe 52 may be a pipe conduit or exhaust flow path through which the exhaust gas discharged through the exhaust manifold 51 is discharged to the outside. The catalyst 53 may be disposed in the middle of the exhaust pipe 52. The catalyst 53 may include a three-way catalyst that purifies hydrocarbon (HC), nitric oxide (NOx), and carbon monoxide (CO) in the exhaust gas. The catalyst 53 may be disposed adjacent to an outlet of the exhaust manifold 51.

The GPF 54 may be a ceramic filter that filters exhaust gas to collect particulate matter (PM) contained in the exhaust gas. The GPF 54 may be disposed downstream of the catalyst 53.

The exhaust gas temperature sensor 55 may detect the temperature of the exhaust gas flowing in the exhaust pipe 52. An output from the exhaust gas temperature sensor 55 may be transmitted to the ECU 100. The exhaust gas temperature sensor 55 may be disposed adjacent to an outlet of the GPF 54 in the exhaust pipe 52.

The differential pressure sensor 56 may detect the pressure difference or differential pressure of the exhaust gas between upstream of the GPF 54 and downstream of the GPF 54 in the exhaust pipe 52. The differential pressure sensor 56 may be coupled to the exhaust pipe 52 via the upstream pipe 57 and the downstream pipe 58. The body of the differential pressure sensor 56 may be disposed adjacent to the exhaust gas temperature sensor 55 that is disposed downstream of the GPF 54 in the exhaust pipe 52.

The upstream pipe 57 may be disposed near an inlet of the GPF 54 and branch from the exhaust pipe 52. The upstream pipe 57 may be communicated with the exhaust pipe 52 to transmit the pressure of the exhaust gas upstream of the GPF 54 to the differential pressure sensor 56.

The downstream pipe 58 may be disposed near the outlet of the GPF 54 and branch from the exhaust pipe 52. The downstream pipe 58 may be communicated with the exhaust pipe 52 to transmit the pressure of the exhaust gas downstream of the GPF 54 to the differential pressure sensor 56.

The differential pressure sensor 56 may generate an electric signal based on the difference between an inner pressure of the upstream pipe 57 and an inner pressure of the downstream pipe 58 and transmit the electric signal to the ECU 100. On the basis of the data on the differential pressure received from the differential pressure sensor 56, the ECU 100 may perform various controls including control of an opening position of the EGR valve and control of regeneration of the GPF 54.

The EGR device 60 may perform exhaust gas recirculation (EGR) in which part of the exhaust gas discharged through the exhaust manifold 51 is extracted as an EGR gas, and the EGR gas is introduced into the intake manifold 46. The EGR device 60 may include an EGR passage 61, an EGR cooler 62, and an EGR valve 63, for example.

The EGR passage 61 may be a pipe conduit through which the exhaust gas or EGR gas is introduced from the exhaust manifold 51 to the intake manifold 46. The EGR cooler 62 may cool the EGR gas flowing in the EGR passage 61 by exchanging heat with cooling water for the engine 1. The EGR cooler 62 may be disposed in the middle of the EGR passage 61. The EGR valve 63 may be a control valve that regulates the flow rate of the EGR gas flowing in the EGR passage 61. The EGR valve 63 may be disposed downstream of the EGR cooler 62 in the EGR passage 61. The EGR valve 63 may have a valve body that is driven to open and close by an electric actuator such as a solenoid valve. The opening position of the EGR valve 63 may be controlled by the ECU 100 on the basis of an opening position map set on the basis of a predetermined target EGR ratio between the EGR gas flow rate and the intake air flow rate. The exhaust gas pressure may change as the state of soot accumulated on the GPF 54 changes, which changes the flow rate in the EGR passage 61 even if the opening position of the EGR valve 63 remains unchanged. A target opening position of the EGR valve 63 may be corrected in accordance with the differential pressure detected by the differential pressure sensor 56.

The ECU 100 may comprehensively control the engine 1 and an auxiliary device of the engine 1. The ECU 100 may include circuitry that includes, for example, a data processor such as a central processing unit (CPU), a storage such as a random access memory (RAM) or a read only memory (ROM), an input and output interface, and a bus that couples these components. The data processor in the ECU 100 may execute a program held in the storage or a program received from an external device via communication. The ECU 100 may also include an accelerator pedal sensor 101 that detects the degree of depressing of a non-illustrated accelerator pedal by the driver.

The ECU 100 may set a driver requested torque on the basis of an output from the accelerator pedal sensor 101, for example. The ECU 100 may control, for example, a throttle-valve opening position, a boost pressure, a fuel injection amount, a fuel injection timing, an ignition timing, and a valve timing, so that an actual torque generated by the engine 1 approximates to the set driver requested torque.

The ECU 100 includes a freezing determination unit 102. The freezing determination unit 102 determines a freezing state and a freezing release state of each of the pipes. The wording "freezing state" used herein may refer to a state in which the moisture in the exhaust gas is congealed, condensed, and frozen in the upstream pipe 57 and the downstream pipe 58 of the differential pressure sensor 56 to occlude the upstream pipe 57 and the downstream pipe 58. The wording "freezing release state" used herein may refer to a state in which each of the upstream pipe 57 and the downstream pipe 58 of the differential pressure sensor 56 is released from the freezing or occluded state as the ice melts in each of the pipes. The freezing determination unit 102 includes a transferred heat estimator 103 and a dissipated heat estimator 104. The transferred heat estimator 103 estimates the amount of heat transferred from the exhaust system 50 to the upstream pipe 57 and the downstream pipe 58 during traveling of the vehicle. The dissipated heat estimator 104 estimates the amount of heat dissipated from (i.e., cooling amount of) the upstream pipe 57 and the downstream pipe 58 through heat exchanging with a traveling wind generated while the vehicle is traveling, for example. The transferred heat estimator 103 and the dissipated heat estimator 104 are described in detail below.

Additionally, a vehicle speed sensor 110 and an ambient temperature sensor 120 may be coupled to the ECU 100. The vehicle speed sensor 110 may detect a traveling speed of the vehicle (hereinafter referred to as a vehicle speed). The vehicle speed sensor 110 may be coupled to the ECU 100 via a non-illustrated behavior control unit that performs antilock brake control and vehicle behavior control, for example. The vehicle speed sensor 110 may be disposed, for example, on a hub that rotatably supports a drive wheel. The vehicle speed sensor 110 may output a signal having a frequency in proportion to the rotary speed of the drive wheel. The ECU 100 may calculate the vehicle speed on the basis of the output from the vehicle speed sensor 110.

The ambient temperature sensor 120 may detect the ambient temperature around the vehicle. In one example, an automatic controller that controls an air conditioner of the vehicle may also serve as the ambient temperature sensor 120. An output from the ambient temperature sensor 120 may be transmitted to the ECU 100.

Figure 2:
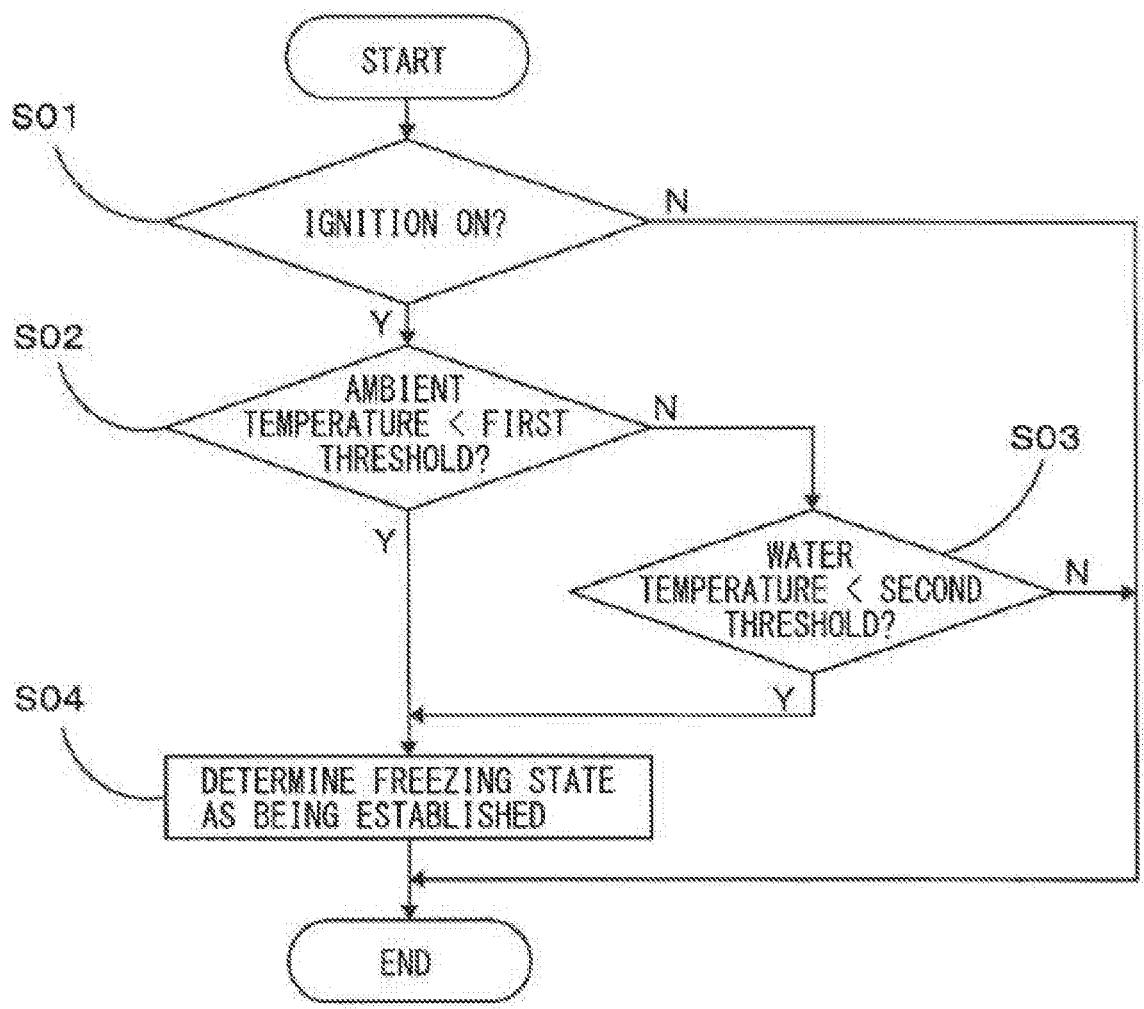
FIG. 2 is a flowchart illustrating an example of a freezing determination process executed by the freezing diagnosing device and the engine control apparatus according to one embodiment of the technology.

Example operations of the freezing diagnosing device for a pressure sensor pipe and the engine control apparatus will now be described. FIG. 2 is a flowchart illustrating a freezing determination process executed by the freezing diagnosing device and the engine control apparatus according to an embodiment of the technology. Note that the freezing determination process may not be executed when a fail determination has been made by the water temperature sensor 21 or the ambient temperature sensor 120 through a self-diagnosis of the vehicle. The freezing determination process will now be described with reference to the steps in sequence.

<Step S01: Determination of Ignition-On>

The ECU 100 may determine whether a non-illustrated ignition switch that controls the main power of the engine 1 and an auxiliary device of the engine 1 is turned on. When the ignition switch is turned on (Step S01: Y), the process may proceed to Step S02. Otherwise (Step S01: N), the process may end (return).

<Step S02: Determination of Ambient Temperature>

The freezing determination unit 102 of the ECU 100 may compare the ambient temperature (outside air temperature around the vehicle) detected by the ambient temperature sensor 120 with a first threshold set in advance. The first threshold may be set in consideration of a temperature at which the moisture in the upstream pipe 57 and the downstream pipe 58 of the exhaust system 50 can freeze. When the ambient temperature is lower than the first threshold (Step S02: Y), the process may proceed to Step S04. Otherwise (Step S02: N), the process may proceed to Step S03.

<Step S03: Determination of Water Temperature>

The freezing determination unit 102 of the ECU 100 may compare the temperature of the cooling water for the engine 1 detected by the water temperature sensor 21 with a second threshold set in advance. Like the first threshold, the second threshold may also be set in consideration of a temperature at which moisture in the upstream pipe 57 and the downstream pipe 58 of the exhaust system 50 can freeze. However, the second threshold may be different from the first threshold. When the temperature of the cooling water is lower than the second threshold (Step S03: Y), the process may proceed to Step S04. Otherwise (Step S03: N), the process may end (return).

<Step S04: Determination of Freezing State>

The freezing determination unit 102 of the ECU 100 may determine a freezing state as being established where one or both of the upstream pipe 57 and the downstream pipe 58 can be occluded by freezing of the moisture in one or both of the upstream pipe 57 and the downstream pipe 58. When determining the freezing state as being established, the freezing determination unit 102 may temporarily prohibit execution of various control based on an output from the differential pressure sensor 56 until a freezing release state (melt state) described below is determined as being established. Thereafter, the process may end (return).

Figure 3:
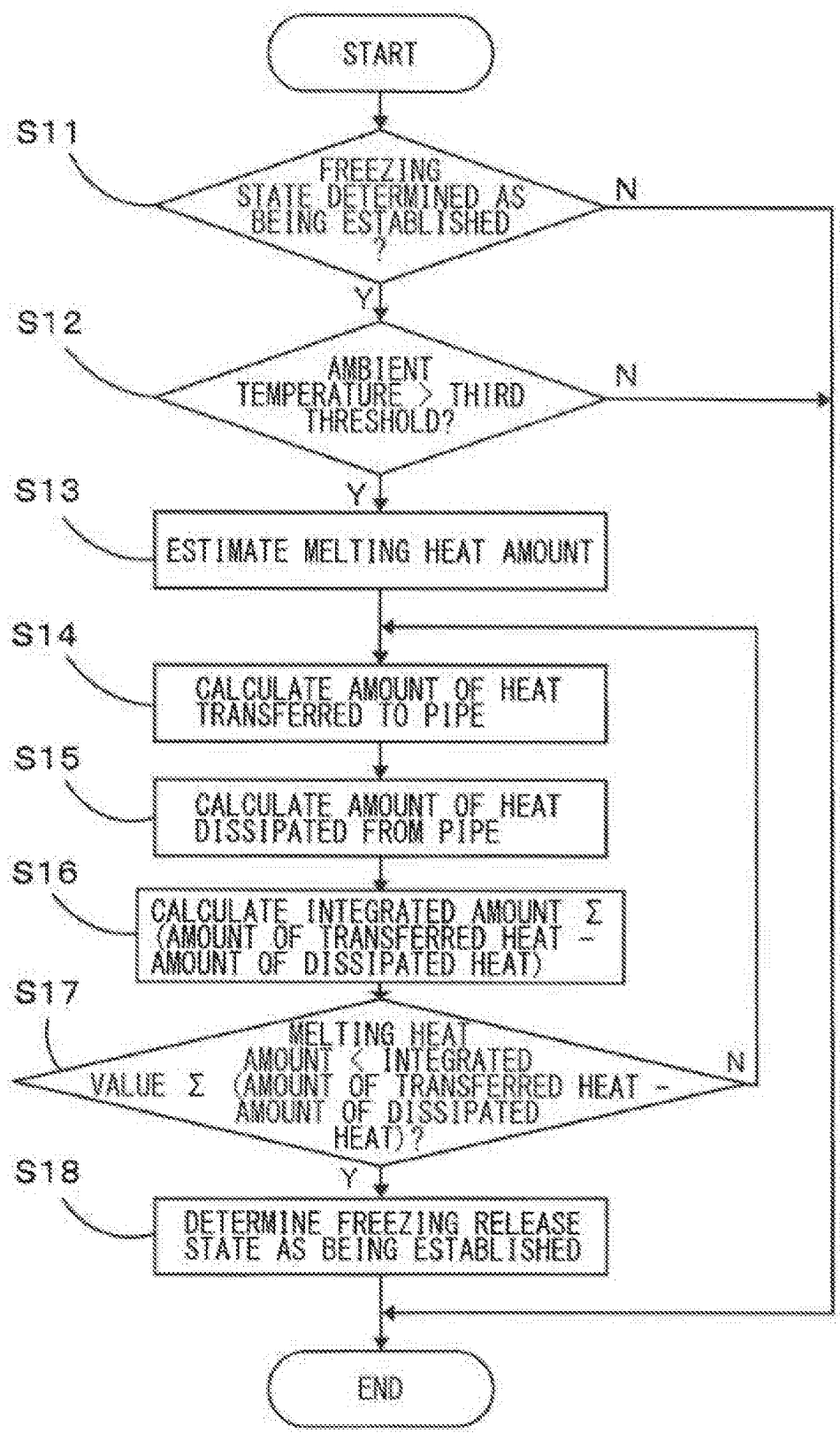
FIG. 3 is a flowchart illustrating an example of a freezing release determination process executed by a freezing diagnosing device and the engine control apparatus according to one embodiment of the technology.

FIG. 3 is a flowchart illustrating a freezing release determination process executed by the freezing diagnosing device and the engine control apparatus according to an embodiment of the technology. Note that the freezing release determination may not be executed when a fail determination has been made by the airflow meter 44, the exhaust gas temperature sensor 55, the vehicle speed sensor 110, or the ambient temperature sensor 120 through a self-diagnosis of the vehicle. The freezing release determination process will now be described with reference to the steps in sequence.

<Step S11: Verification of Freezing State>

The freezing determination unit 102 of the ECU 100 may verify whether the freezing state has been determined as being established in Step S04 described above. When the freezing determination unit 102 verifies that the freezing state has been determined as being established in Step 04 (Step S11: Y), the process may proceed to Step S12. Otherwise (Step S11: N), the process may end (return).

<Step S12: Determination of Ambient Temperature>

The freezing determination unit 102 of the ECU 100 may compare the ambient temperature (outside air temperature around the vehicle) detected by the ambient temperature sensor 120 with a third threshold. The third threshold may be set in consideration of an ambient temperature at which the ice can melt in the upstream pipe 57 or the downstream pipe 58 when receiving heat through the exhaust pipe 52, for example, during driving of the engine 1. In one example, the third threshold may be set to a value substantially equal to the first threshold or a value equal to or greater than the first threshold. When the ambient temperature is higher than the third threshold (Step S12: Y), the process may proceed to Step S13. Otherwise (Step S12: N), the process may end (return).

<Step S13: Estimation of Melting Heat Amount>

The freezing determination unit 102 of the ECU 100 may estimate an amount of heat required for melting the ice in the upstream pipe 57 and the downstream pipe 58 (hereinafter referred to as melting heat amount). The melting heat amount may be estimated assuming the worst case scenario in which the interiors of the upstream pipe 57 and the downstream pipe 58 are filled with ice having a temperature substantially equal to the temperature of the cooling water for the engine 1 or the ambient temperature whichever is lower. This prevents the freezing release state from being falsely determined when some ice actually remain frozen in the upstream pipe 57 and the downstream pipe 58. Thereafter, the process may proceed to Step S14.

<Step S14: Calculation of Amount of Heat Transferred to Pipe>

The transferred heat estimator 103 of the ECU 100 may calculate an amount of heat currently transferred from the exhaust system 50 to the upstream pipe 57 and the downstream pipe 58 per unit time. The amount of transferred heat may include the amount of heat transferred from the exhaust pipe 52 to the upstream pipe 57 and the downstream pipe 58 through solid heat conduction, and the amount of heat transferred from the surface of the exhaust pipe 52 to the surfaces of the upstream pipe 57 and the downstream pipe 58 through radiation. The transferred heat estimator 103 may calculate the amount of transferred heat on the basis of the intake air mass in the engine 1 detected by the airflow meter 44 and the exhaust gas temperature detected by the exhaust gas temperature sensor 55. Note that the intake air mass in the engine 1 may have a correlation to the flow rate of the exhaust gas in the exhaust pipe 52. The amount of transferred heat may increase with an increase in the intake air mass. The amount of transferred heat may also increase with an increase in the exhaust gas temperature. In one example, the amount of transferred heat may be calculated on the basis of the intake air mass and the exhaust gas temperature using a mathematical function. In another example, the amount of transferred heat may be retrieved from a map defining a correlation between the intake air mass and the exhaust gas temperature. The mathematical function and the map may be generated on the basis of experimental or simulation results. Thereafter, the process may proceed to step S15.

<Step S15: Calculation of Amount of Heat Dissipated from Pipe>

The dissipated heat estimator 104 of the ECU 100 may calculate an amount of heat currently dissipated from (i.e., a cooling amount of) the upstream pipe 57 and the downstream pipe 58 to the ambient air per unit time. The dissipated heat estimator 104 may calculate the amount of dissipated heat on the basis of the vehicle speed detected by the vehicle speed sensor 110 and the ambient temperature detected by the ambient temperature sensor 120. Note that the vehicle speed may be substantially equal to the flow speed of a traveling wind that is an airflow generated while the vehicle is traveling and flowing relative to the vehicle body. The amount of dissipated heat may increase with an increase in the vehicle speed. The amount of dissipated heat may also increase with a decrease in the ambient temperature. In one example, the amount of dissipated heat may be calculated on the basis of the vehicle speed and the ambient temperature using a mathematical function. In another example, the amount of dissipated heat may be retrieved from a map defining a correlation between the vehicle speed and the ambient temperature. The mathematical function and the map may be generated on the basis of experimental or simulation results. Thereafter, the process may proceed to Step S16.

<Step S16: Calculation of Integrated Value of Difference Between Amount of Transferred Heat and Amount of Dissipated Heat>

The freezing determination unit 102 of the ECU 100 may calculate a difference between the amount of transferred heat and the amount of dissipated heat by subtracting the amount of dissipated heat determined in Step S15 from the amount of transferred heat determined in Step S14. The freezing determination unit 102 may then integrate the differences calculated from the start of the engine to this point of time into an integrated value Σ. Thereafter, the process may proceed to Step S17.

<Step S17: Comparison of Melting Heat Amount with Integrated Value>

The freezing determination unit 102 of the ECU 100 may compare the melting heat amount estimated in Step S13 with the integrated value/calculated in Step S16. When the integrated value/is greater than the melting heat amount (Step S17: Y), the process may proceed to Step S18. Otherwise (Step S17: N), the process may return to Step S14 and the subsequent steps may be repeated.

<Step S18: Determination of Freezing Release State>

The freezing determination unit 102 of the ECU 100 may determine the freezing release state as being established where the upstream pipe 57 and the downstream pipe 58 are released from the freezing state. When determining the freezing release state as being established, the freezing determination unit 102 may restart or recover the various control based on an output from the differential pressure sensor 56 prohibited in Step S04. Thereafter, the process may end (return).

According to at least one of the embodiments described above, it is possible to obtain at least the following example effects.

(1) The freezing states of the upstream pipe 57 and the downstream pipe 58 of the differential pressure sensor 56 are determined in consideration of the ambient temperature and the temperature of the cooling water for the engine. Even when the upstream pipe 57 and the downstream pipe 58 having been in the freezing states in a low-temperature environment at night is not melted into the freezing release state despite an increase in the ambient temperature during the daytime, for example, it is possible to appropriately determine the freezing states of the upstream pipe 57 and the downstream pipe 58 while preventing the freezing states of the upstream pipe 57 and the downstream pipe 58 from being falsely determined or overlooked.

(2) The amount of heat transferred from the exhaust system 50 to the upstream pipe 57 and the downstream pipe 58 and the amount of heat dissipated from the upstream pipe 57 and the downstream pipe 58 to a traveling wind may be estimated. A difference between the amount of transferred heat and the amount of dissipated heat may be calculated and integrated into an integrated value. The integrated value may be compared with the melting heat amount required for melting the ice in the upstream pipe 57 and the downstream pipe 58 to determine the freezing release states of the upstream pipe 57 and the downstream pipe 58. Accordingly, it is possible to appropriately determine the freezing release states of the upstream pipe 57 and the downstream pipe 58.

(3) The amount of heat transferred to the upstream pipe 57 and the downstream pipe 58 may be determined on the basis of the intake air mass detected by the airflow meter 44 and the exhaust gas temperature detected by the exhaust gas temperature sensor 55. This allows for a simple and accurate estimation of the amount of heat transferred from the exhaust passage to the upstream pipe 57 and the downstream pipe 58 based on an output from a sensor or the like installed on a general vehicle.

(4) The amount of heat dissipated from the upstream pipe 57 and the downstream pipe 58 may be estimated on the basis of the vehicle speed detected by the vehicle speed sensor 110 and the ambient temperature detected by the ambient temperature sensor 120. This allows for a simple and accurate estimation of the amount of heat dissipated from the upstream pipe 57 and the downstream pipe 58 to the ambient air based on an output from a sensor or the like installed on a general vehicle.

(5) The control based on an output from the differential pressure sensor 56 is prohibited from being executed when the freezing states of the upstream pipe 57 and the downstream pipe 58 are determined as being established. This prevents control based on a false differential pressure from being executed when an appropriate detection of the differential pressure is hindered due to the freezing of the upstream pipe 57 and the downstream pipe 58.

(6) The control based on an output from the differential pressure sensor 56 may be recovered when the freezing release states of the upstream pipe 57 and the downstream pipe 58 are determined as being established. This allows for an appropriate determination of the freezing release states (melt states) of the upstream pipe 57 and the downstream pipe 58 in consideration of influences of the heat transferred from the exhaust system 50 and the heat dissipated to a traveling wind after the freezing of the upstream pipe 57 and the downstream pipe 58. Such recovery of the control based on an output from the differential pressure sensor 56 makes it possible to cause the vehicle to exhibit original functions.

Modification Examples

It should be appreciated that the technology is not be limited to the foregoing embodiments, and various modifications or alternations may be made within the scope of the technology.

(1) The configurations of the freezing diagnosing device for the pressure sensor pipe, the engine control apparatus, and the engine should not be limited to those described in the foregoing embodiments and may be modified as appropriate. For example, although the engine is a gasoline engine and the pressure sensor is a differential pressure sensor that detects a differential pressure before and behind the gasoline particulate filter in the foregoing embodiments, the engine may be a diesel engine and the pressure sensor may be a differential pressure sensor that detects a differential pressure between before and behind the diesel particulate filter in a modification example of the technology. In another modification example of the technology, the pressure sensor may detect a pressure at one or both of upstream and downstream of the particulate matter filter to determine the freezing state of the pipe. For example, the pressure sensor may detect an absolute pressure upstream of the particulate matter filter and monitor the difference between the absolute pressure upstream of the particulate matter filter and the atmospheric pressure or an estimated pressure downstream of the particulate matter filter. Any embodiment of the technology may be applied to an engine having a fuel cycle or combustion cycle different from that described in the foregoing embodiments and modifications. The number of cylinders in the engine, the positional arrangement of the cylinders, the provision of a supercharger or types of the supercharger, and the fuel injection scheme are not limited to those described in the foregoing embodiments and modification examples.

(2) The freezing state is determined on the basis of the temperature of cooling water in the foregoing embodiments and modification examples. However, in an alternative embodiment, the freezing state may be determined on the basis of other parameters, such as the temperature of other liquid, such as a lubricant, held in the engine.

(3) In the foregoing embodiments and modification examples, the control of the opening position of the EGR valve and the control of regeneration of the gasoline particulate filter are prohibited after the freezing state is determined as being established and until the freezing release state is determined as being established. However, the control to be prohibited should not be limited to those described in the foregoing embodiment and modification examples and may include other control.

Any of the existing techniques described above that determines the freezing state of a pressure sensor pipe on the basis of the ambient temperature finds it difficult to appropriately determine the freezing state of the pressure sensor pipe when the pressure sensor pipe having been in the freezing state in a low-temperature environment at night is not melted despite an increase in the ambient temperature during the daytime, for example. Additionally, any of the existing techniques described above that determines the freezing state of the pressure sensor pipe on the basis of an output from a pressure sensor finds it difficult to appropriately discriminate between the freezing of the pressure sensor pipe and a failure of the pressure sensor itself or a failure of a wiring line, for example.

Even if the freezing state of the pressure sensor pipe is determined as being established once, the pressure sensor will become available when the freezing state is released after the start of the operation of the vehicle. Accordingly, it is desired to appropriately detect the freezing release state of the pressure sensor pipe.

Unfortunately, the existing techniques described above that determine the freezing release state only on the basis of the ambient temperature or the exhaust gas temperature fail to take into consideration of the influences of cooling by a traveling wind generated while the vehicle is traveling and the gas flow rate in the exhaust passage. The existing techniques described above thus find it difficult to appropriately detect the freezing release state of the pressure sensor pipe.

In contrast, according to the foregoing embodiments and modification examples of the technology, it is possible to provide a freezing diagnosing device that appropriately detects the freezing state of a pressure sensor pipe. Further, it is possible to provide an engine control apparatus that appropriately controls an engine even in a possible case of freezing of the pressure sensor pipe.

According to at least one of the embodiments and modification examples of the technology, even if the vehicle has been soaked in an environment having a temperature lower than the current ambient temperature, it is possible to appropriately determine the freezing state while preventing the freezing state from being falsely determined or overlooked on the basis of the current ambient temperature. For example, when the interior of the differential pressure pipe having been in the freezing state at night is not melted despite an increase in the ambient temperature during the daytime.

According to at least one of the embodiments and modification examples of the technology, it is possible to appropriately determine the freezing state in consideration of influences of the heat transferred from the exhaust passage to the pipe (heat transmission) and the heat dissipated from the pipe through heat exchanging with a traveling wind (cooling).

According to at least one of the embodiments and modification examples of the technology, it is possible to achieve a simple and accurate estimation of the amount of heat transferred from the exhaust passage to the pipe based on an output from a sensor or the like installed on a general vehicle.

According to at least one of the embodiments and modification examples of the technology, it is possible to achieve a simple and accurate estimation of the amount of heat dissipated from the pipe to a traveling wind based on an output from a sensor or the like installed on a general vehicle.

According to at least one of the embodiments and modification examples of the technology, it is possible to prevent the control based on a false differential pressure from being executed when an appropriate detection of the differential pressure is hindered due to the freezing of the pipe.

According to at least one of the embodiments and modification examples of the technology, it is possible to prevent the control based on a false differential pressure from being executed when an appropriate detection of the differential pressure is hindered due to the freezing of the pipe. It is also possible to appropriately determine the freezing release state (melt state) of the pipe in consideration of influences of the heat transferred from the exhaust passage and the heat dissipated to a traveling wind after freezing of the pipe, and to recover the control based on an output from the pressure sensor to cause the vehicle to exhibit original functions.

According to the embodiments and modification examples of the technology described above, it is possible to provide a freezing diagnosing device that appropriately determines the freezing state of a pressure sensor pipe. It is also possible to provide an engine control apparatus that appropriately controls an engine even in a possible case of freezing of the pressure sensor pipe.

The freezing determination unit 102 in the ECU 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the freezing determination unit 102. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the freezing determination unit 102 in the ECU 100 illustrated in FIG. 1.

Although some example configurations and example processing according to the embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the spirit of the technology. The technology is intended to include such modifications and alterations in so far as they fall within the scope of the appended claims or the equivalents thereof.

The invention claimed is:

1. A freezing diagnosing device to be installed in an engine, the engine being provided with: an exhaust passage; a particulate matter filter disposed in the exhaust passage; a pipe having a first end and a second end opposite to the first end, the first end being coupled to a region adjacent to the particulate matter filter in the exhaust passage; and a pressure sensor coupled to the second end of the pipe, the freezing diagnosing device comprising:
an ambient temperature sensor configured to detect an ambient temperature;
a liquid temperature sensor configured to detect a temperature of a liquid held in the engine; and
an engine control unit (ECU) configured to:
determine a freezing state of the pipe as being established when the detected ambient temperature is less than or equal to a first threshold and/or the detected liquid temperature is less than or equal to a second threshold, estimate an amount of heat transferred from the exhaust passage to the pipe,
estimate an amount of heat dissipated from the pipe,
determine a heat difference by subtracting the estimated amount of dissipated heat from the estimated amount of transferred heat,
determine a melting heat amount as an amount of heat required for melting a volume of ice equivalent to an interior volume of the pipe, and
determine, after the freezing state is established, a freezing release state of the pipe as being established when an integrated value of the heat difference is greater than the melting heat amount,
wherein the ECU is further configured to execute a control of the engine based on an output of the pressure sensor, and to prohibit the execution of the control after the freezing state is established and until the freezing release state is established.

2. The freezing diagnosing device according to claim 1, further comprising:
an airflow meter configured to detect an intake air mass in the engine; and
an exhaust gas temperature sensor configured to detect a temperature of exhaust gas in the exhaust passage,
wherein the ECU is configured to estimate the amount of transferred heat based on the detected intake air mass and the detected exhaust gas temperature.

3. The freezing diagnosing device according to claim 1, further comprising:
a vehicle speed sensor configured to detect a traveling speed of a vehicle including the engine;
wherein the ECU is configured to estimate the amount of dissipated heat based on the detected traveling speed and the detected ambient temperature.

4. The freezing diagnosing device according to claim 1, wherein:
the pipe includes an upstream pipe and a downstream pipe, the upstream pipe arranged upstream of the particulate matter filter in the exhaust passage, the downstream pipe arranged downstream of the particulate matter filter in the exhaust passage,
the pressure sensor is coupled to the upstream pipe and the downstream pipe and configured to detect a differential pressure between an inner pressure of the upstream pipe and an inner pressure of the downstream pipe, and
the ECU is further configured to determine the freezing state and the freezing release state of one or both of the upstream pipe and the downstream pipe.

5. A freezing diagnosing device to be installed in an engine, the engine being provided with: an exhaust passage; a particulate matter filter disposed in the exhaust passage; a pipe having a first end and a second end opposite to the first end, the first end being coupled to a region adjacent to the particulate matter filter in the exhaust passage; and a pressure sensor coupled to the second end of the pipe, the freezing diagnosing device comprising:
an engine control unit (ECU) configured to:
determine whether a freezing state of the pipe is established,
estimate an amount of heat transferred from the exhaust passage to the pipe,
estimate an amount of heat dissipated from the pipe,
determine a heat difference by subtracting the estimated amount of dissipated heat from the estimated amount of transferred heat,
determine e melting heat amount as an amount of heat required for melting a volume of ice equivalent to an interior volume of the pipe, and
determine, after the freezing state is established, a freezing release state of the pipe as being established when an integrated value of the heat difference is greater than the melting heat amount,
wherein the ECU is further configured to execute a control of the engine based on an output of the pressure sensor, and to prohibit the execution of the control after the freezing state is established and until the freezing release state is established.

6. The freezing diagnosing device according to claim 5, further comprising:
an airflow meter configured to detect an intake air mass in the engine; and
an exhaust gas temperature sensor configured to detect a temperature of exhaust gas in the exhaust passage,
wherein the ECU is configured to estimate the amount of transferred heat based on the detected intake air mass and the detected exhaust gas temperature.

7. The freezing diagnosing device according to claim 5, further comprising:
a vehicle speed sensor configured to detect a traveling speed of a vehicle including the engine; and
an ambient temperature sensor configured to detect an ambient temperature,
wherein the ECU is configured to estimate the amount of dissipated heat based on the detected traveling speed and the detected ambient temperature.

8. The freezing diagnosing device according to claim 5, wherein:
the pipe includes an upstream pipe and a downstream pipe, the upstream pipe arranged upstream of the particulate matter filter in the exhaust passage, the downstream pipe arranged downstream of the particulate matter filter in the exhaust passage,
the pressure sensor is coupled to the upstream pipe and the downstream pipe and configured to detect a differential pressure between an inner pressure of the upstream pipe and an inner pressure of the downstream pipe, and
the ECU is further configured to determine the freezing state and the freezing release state of one or both of the upstream pipe and the downstream pipe.

9. A freezing diagnosing device to be installed in an engine, the engine being provided with: an exhaust passage; a particulate matter filter disposed in the exhaust passage; a pipe having a first end and a second end opposite to the first end, the first end being coupled to a region adjacent to the particulate matter filter in the exhaust passage; and a pressure sensor coupled to the second end of the pipe, the freezing diagnosing device comprising:
an ambient temperature sensor configured to detect an ambient temperature;
a liquid temperature sensor configured to detect a temperature of a liquid held in the engine; and
circuitry configured to:
determine a freezing state of the pipe as being established when the detected ambient temperature is less than or equal to a first threshold and/or the detected liquid temperature is less than or equal to a second threshold,
estimate an amount of heat transferred from the exhaust passage to the pipe,
estimate an amount of heat dissipated from the pipe, determine a heat difference by subtracting the estimated amount of dissipated heat from the estimated amount of transferred heat, determine a melting heat amount as an amount of heat required for melting a volume of ice equivalent to an interior volume of the pipe, and determine, after the freezing state is established, a freezing release state of the pipe as being established when an integrated value of the heat difference is greater than the melting heat amount, wherein the circuitry is further configured to execute a control of the engine based on an output of the pressure sensor, and to prohibit the execution of the control when the freezing state is established.

* * * * *